(12) United States Patent
Kamperman

(10) Patent No.: US 8,543,819 B2
(45) Date of Patent: Sep. 24, 2013

(54) SECURE AUTHENTICATED DISTANCE MEASUREMENT

(75) Inventor: Franciscus Lucas Antonius Johannes Kamperman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 34 days.

(21) Appl. No.: 12/508,917

(22) Filed: Jul. 24, 2009

(65) Prior Publication Data

US 2009/0287927 A1 Nov. 19, 2009

Related U.S. Application Data

(63) Continuation of application No. 10/521,858, filed as application No. PCT/IB03/02932 on Jun. 27, 2003.

(30) Foreign Application Priority Data

Jul. 26, 2002 (EP) .................................. 02078076

(51) Int. Cl.
*H04L 9/32* (2006.01)
*H04L 29/06* (2006.01)

(52) U.S. Cl.
USPC ............................. 713/170; 713/168; 713/156

(58) Field of Classification Search
USPC ................ 713/150–153, 155–157, 160–161, 713/168, 170–171, 181; 726/2–10
See application file for complete search history.

(56) References Cited

U.S. PATENT DOCUMENTS

| | | | |
|---|---|---|---|
| 4,438,824 A | | 3/1984 | Mueller-Schloer |
| 4,688,036 A | * | 8/1987 | Hirano et al. ............... 340/5.62 |
| 5,126,746 A | | 6/1992 | Gritton |
| 5,723,911 A | * | 3/1998 | Glehr ............................ 340/10.5 |
| 5,778,071 A | * | 7/1998 | Caputo et al. .................. 713/159 |
| 5,937,065 A | * | 8/1999 | Simon et al. ................... 380/262 |
| 5,949,877 A | * | 9/1999 | Traw et al. ..................... 713/171 |
| 5,983,347 A | * | 11/1999 | Brinkmeyer et al. ........ 340/5.62 |
| 6,085,320 A | * | 7/2000 | Kaliski, Jr. .................... 713/168 |
| 6,088,450 A | * | 7/2000 | Davis et al. .................... 713/182 |

(Continued)

FOREIGN PATENT DOCUMENTS

| | | |
|---|---|---|
| JP | 4306760 A | 10/1992 |
| JP | 6019948 A | 1/1994 |

(Continued)

OTHER PUBLICATIONS

Boyd, Colin et al. "Protocols for Authentication and Key Establishment," Sep. 17, 2003, Springer-Verlag, p. 116-120, 195-196, 305.*

(Continued)

*Primary Examiner* — Darren B Schwartz

(57) ABSTRACT

The invention relates to a method for a first communication device to performing authenticated distance measurement between said first communication device and a second communication device, wherein the first and the second communication device share a common secret and said common secret is used for performing the distance measurement between said first and said second communication device. The invention also relates to a method of determining whether data stored on a first communication device are to be accessed by a second communication device. Moreover, the invention relates to a communication device for performing authenticated distance measurement to a second communication device. The invention also relates to an apparatus for playing back multimedia content comprising a communication device.

16 Claims, 3 Drawing Sheets

(56) References Cited

U.S. PATENT DOCUMENTS

Figure 1:
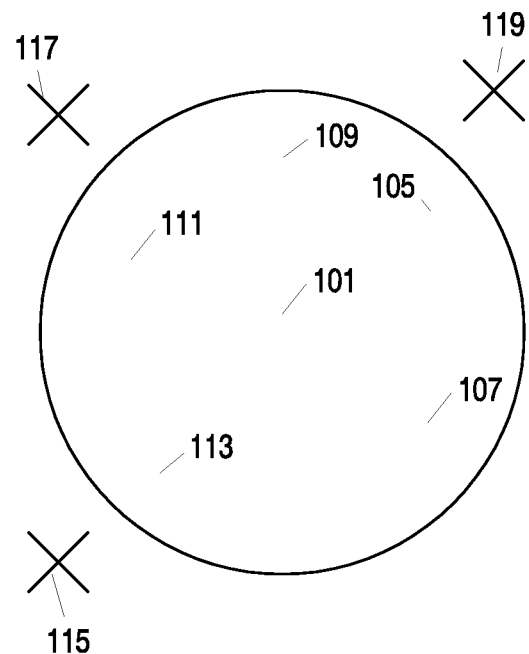

| | | | |
|---|---|---|---|
| 6,151,676 | A | 11/2000 | Cuccia et al. |
| 6,208,239 | B1* | 3/2001 | Muller et al. ............ 340/426.35 |
| 6,346,878 | B1* | 2/2002 | Pohlman et al. .............. 340/435 |
| 6,484,948 | B1 | 11/2002 | Sonoda |
| 6,493,825 | B1 | 12/2002 | Blumenau et al. |
| 7,200,233 | B1* | 4/2007 | Keller et al. ................. 380/268 |
| 2001/0008558 | A1* | 7/2001 | Hirafuji ........................ 380/220 |
| 2001/0043702 | A1 | 11/2001 | Elteto et al. |
| 2001/0044786 | A1* | 11/2001 | Ishibashi ......................... 705/77 |
| 2002/0007452 | A1* | 1/2002 | Traw et al. .................... 713/152 |
| 2002/0026424 | A1* | 2/2002 | Akashi ............................ 705/57 |
| 2002/0026576 | A1* | 2/2002 | Das-Purkayastha et al. . 713/156 |
| 2002/0035690 | A1* | 3/2002 | Nakano ......................... 713/171 |
| 2002/0061748 | A1* | 5/2002 | Nakakita et al. .............. 455/435 |
| 2002/0078227 | A1* | 6/2002 | Kronenberg .................. 709/237 |
| 2003/0021418 | A1* | 1/2003 | Arakawa et al. .............. 380/277 |
| 2003/0030542 | A1* | 2/2003 | von Hoffmann ............. 340/5.61 |
| 2003/0065918 | A1* | 4/2003 | Willey .......................... 713/168 |
| 2003/0070092 | A1* | 4/2003 | Hawkes et al. ............... 713/201 |
| 2003/0112978 | A1* | 6/2003 | Rodman et al. ............... 380/277 |
| 2003/0184431 | A1* | 10/2003 | Lundkvist ...................... 340/5.2 |
| 2003/0220765 | A1* | 11/2003 | Overy et al. ................... 702/158 |
| 2005/0114647 | A1* | 5/2005 | Epstein ......................... 713/153 |
| 2005/0265503 | A1* | 12/2005 | Rofheart et al. .............. 375/354 |
| 2006/0294362 | A1* | 12/2006 | Epstein ......................... 713/153 |

FOREIGN PATENT DOCUMENTS

| | | |
|---|---|---|
| JP | 9170364 A | 6/1997 |
| JP | 2001257672 A | 9/2001 |
| WO | 9739553 A1 | 10/1997 |
| WO | 0193434 A2 | 12/2001 |
| WO | 0233887 A2 | 4/2002 |
| WO | 0235036 A1 | 5/2002 |

OTHER PUBLICATIONS

Brands et al, "Distance-Bounding Protocols", Eurocrypt '93, 1993, pp. 344-359.

Kindberg et al, "Context Authentication Using Contrained Channels", Undated, p. 108.

Hitachi, Ltd, "5C Digital Transmission Content Protection White Paper", REV. 1.0, July 14, 1998, pp. 1-13.

* cited by examiner

SECURE AUTHENTICATED DISTANCE MEASUREMENT

The invention relates to a method for a first communication device to performing authenticated distance measurement between a first communication device and a second communication device. The invention also relates to a method of determining whether data stored on a first communication device is to be accessed by a second communication device. Moreover, the invention relates to a communication device for performing authenticated distance measurement to a second communication device. The invention also relates to an apparatus for playing back multimedia content comprising a communication device.

Digital media have become popular carriers for various types of data information. Computer software and audio information, for instance, are widely available on optical compact disks (CDs) and recently also DVD has gained in distribution share. The CD and the DVD utilize a common standard for the digital recording of data, software, images, and audio. Additional media, such as recordable discs, solid-state memory, and the like, are making considerable gains in the software and data distribution market.

The substantially superior quality of the digital format as compared to the analog format renders the former substantially more prone to unauthorized copying and pirating, further a digital format is both easier and faster to copy. Copying of a digital data stream, whether compressed, uncompressed, encrypted or non-encrypted, typically does not lead to any appreciable loss of quality in the data. Digital copying thus is essentially unlimited in terms of multi-generation copying. Analog data with its signal to noise ratio loss with every sequential copy, on the other hand, is naturally limited in terms of multi-generation and mass copying.

The advent of the recent popularity in the digital format has also brought about a slew of copy protection and DRM systems and methods. These systems and methods use technologies such as encryption, watermarking and right descriptions (e.g. rules for accessing and copying data).

One way of protecting content in the form of digital data is to ensure that content will only be transferred between devices if
 the receiving device has been authenticated as being a compliant device,
 if the user of the content has the right to transfer (move, copy) that content to another device.

If transfer of content is allowed, this will typically be performed in an encrypted way to make sure that the content cannot be captured illegally in a useful format.

Technology to perform device authentication and encrypted content transfer is available and is called a secure authenticated channel (SAC). Although it might be allowed to make copies of content over a SAC, the content industry is very bullish on content distribution over the Internet. This results in disagreement of the content industry on transferring content over interfaces that match well with the Internet, e.g. Ethernet.

Further, it should be possible for a user visiting his neighbour to watch a movie, which he owns, on the neighbour's big television screen. Typically, the content owner will disallow this, but it might become acceptable if it can be proved that a license holder of that movie (or a device that the license holder owns) is near that television screen.

It is therefore of interest to be able to include an authenticated distance measurement when deciding whether content should be accessed or copied by other devices.

In the article by Stefan Brands and David Chaum, "Distance-Bounding protocols", Eurocrypt '93 (1993), Pages 344-359, integration of distance-bounding protocols with public-key identification schemes is described. Here distance measurement is described based on time measurement using challenge and response bits and with the use of a commitment protocol. This does not allow authenticated device compliancy testing and is not efficient when two devices must also authenticate each other.

It is an object of the invention to obtain a solution to the problem of performing a secure transfer of content within a limited distance.

This is obtained by a method for a first communication device to performing authenticated distance measurement between said first communication device and a second communication device, wherein the first and the second communication device share a common secret and said common secret is used for performing the distance measurement between said first and said second communication device.

Because the common secret is being used for performing the distance measurement, it can be ensured that when measuring the distance from the first communication device to the second communication device, it is the distance between the right devices that is being measured.

The method combines a distance measurement protocol with an authentication protocol. This enables authenticated device compliancy testing and is efficient, because a secure channel is anyhow needed to enable secure communication between devices and a device can first be tested on compliancy before a distance measurement is executed.

In a specific embodiment, the authenticated distance measurement is performed according to the following steps,
 transmitting a first signal from the first communication device to the second communication device at a first time t1, said second communication device being adapted for receiving said first signal, generating a second signal by modifying the received first signal according to the common secret and transmitting the second signal to the first device,
 receiving the second signal at a second time t2,
 checking if the second signal has been modified according to the common secret,
 determining the distance between the first and the second communication device according to a time difference between t1 and t2.

When measuring a distance by measuring the time difference between transmitting and receiving a signal and using a secret, shared between the first and the second communication device, for determining whether the returned signal really originated from the second communication device, the distance is measured in a secure authenticated way ensuring that the distance will not be measured to a third communication device (not knowing the secret). Using the shared secret for modifying the signal is a simple way to perform a secure authenticated distance measurement.

In a specific embodiment the first signal is a spread spectrum signal. Thereby a high resolution is obtained and it is possible to cope with bad transmission conditions (e.g. wireless environments with a lot of reflections).

In another embodiment the step of checking if the second signal has been modified according to the common secret is performed by the steps of,
 generating a third signal by modifying the first signal according to the common secret,
 comparing the third signal with the received second signal.

This method is an easy and simple way of performing the check, but it requires that both the first communication device and the second communication device know how the first signal is being modified using the common secret.

In a specific embodiment the first signal and the common secret are bit words and the second signal comprises information being generated by performing an XOR between the bit words. Thereby, it is a very simple operation that has to be performed, resulting in demand for few resources by both the first and the second communication device when performing the operation.

In an embodiment the common secret has been shared before performing the distance measurement, the sharing being performed by the steps of, performing an authentication check from the first communication device on the second communication device by checking whether said second communication device is compliant with a set of predefined compliance rules, if the second communication device is compliant, sharing said common secret by transmitting said secret to the second communication device.

This is a secure way of performing the sharing of the secret, ensuring that only devices being compliant with compliance rules can receive the secret. Further, the shared secret can afterwards be used for generating a SAC channel between the two devices. The secret could be shared using e.g. key transport mechanisms as described in ISO 11770-3. Alternatively, a key agreement protocol could be used, which e.g. is also described in ISO 11770-3.

In another embodiment the authentication check further comprises checking if the identification of the second device is compliant with an expected identification. Thereby, it is ensured that the second device really is the device that it should be. The identity could be obtained by checking a certificate stored in the second device.

The invention also relates to a method of determining whether data stored on a first communication device are to be accessed by a second communication device, the method comprising the step of performing a distance measurement between the first and the second communication device and checking whether said measured distance is within a predefined distance interval, wherein the distance measurement is an authenticated distance measurement according to the above. By using the authenticated distance measurement in connection with sharing data between devices, unauthorised distribution of content can be reduced.

In a specific embodiment the data stored on the first device is sent to the second device if it is determined that the data stored on the first device are to be accessed by the second device.

The invention also relates to a method of determining whether data stored on a first communication device are to be accessed by a second communication device, the method comprising the step of performing a distance measurement between a third communication device and the second communication device and checking whether said measured distance is within a predefined distance interval, wherein the distance measurement is an authenticated distance measurement according to the above. In this embodiment, the distance is not measured between the first communication device, on which the data are stored, and the second communication device. Instead, the distance is measured between a third communication device and the second communication device, where the third communication device could be personal to the owner of the content.

The invention also relates to a communication device for performing authenticated distance measurement to a second communication device, where the communication device shares a common secret with the second communication device and where the communication device comprises means for measuring the distance to the second device using said common secret.

In an embodiment the device comprises, means for transmitting a first signal to a second communication device at a first time t1, said second communication device being adapted for receiving said first signal, generating a second signal by modifying the received first signal according to the common secret and transmitting the second signal, means for receiving the second signal at a second time t2, means for checking if the second signal has been modified according to the common secret, means for determining the distance between the first and the second communication device according to a time difference between t1 and t2.

The invention also relates to an apparatus for playing back multimedia content comprising a communication device according to the above.

Figure 2:
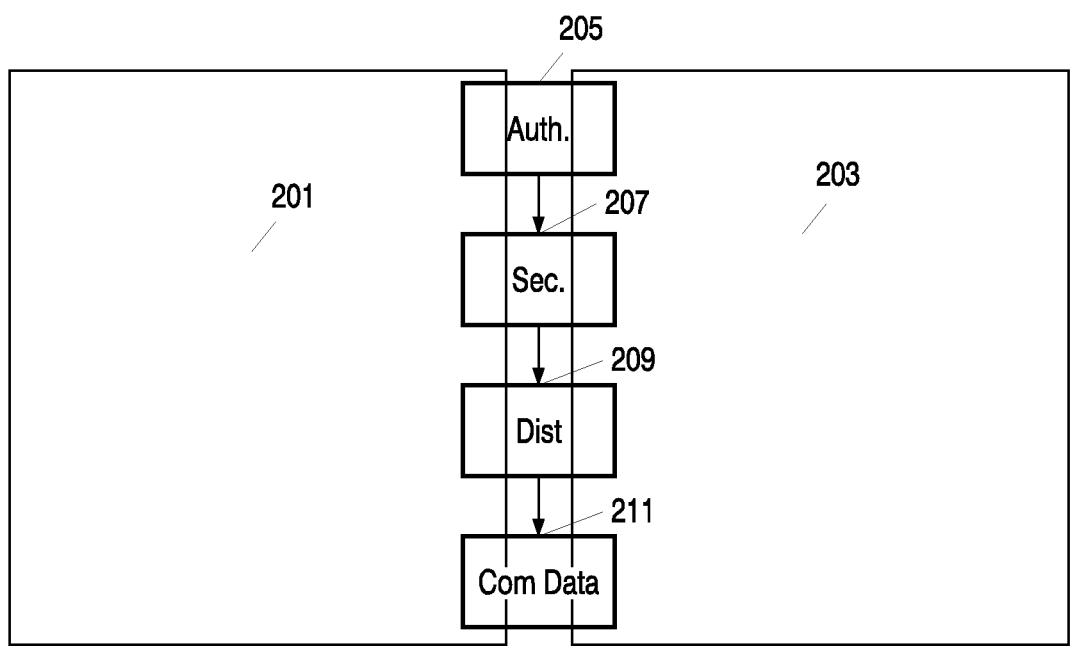
Figure 3:
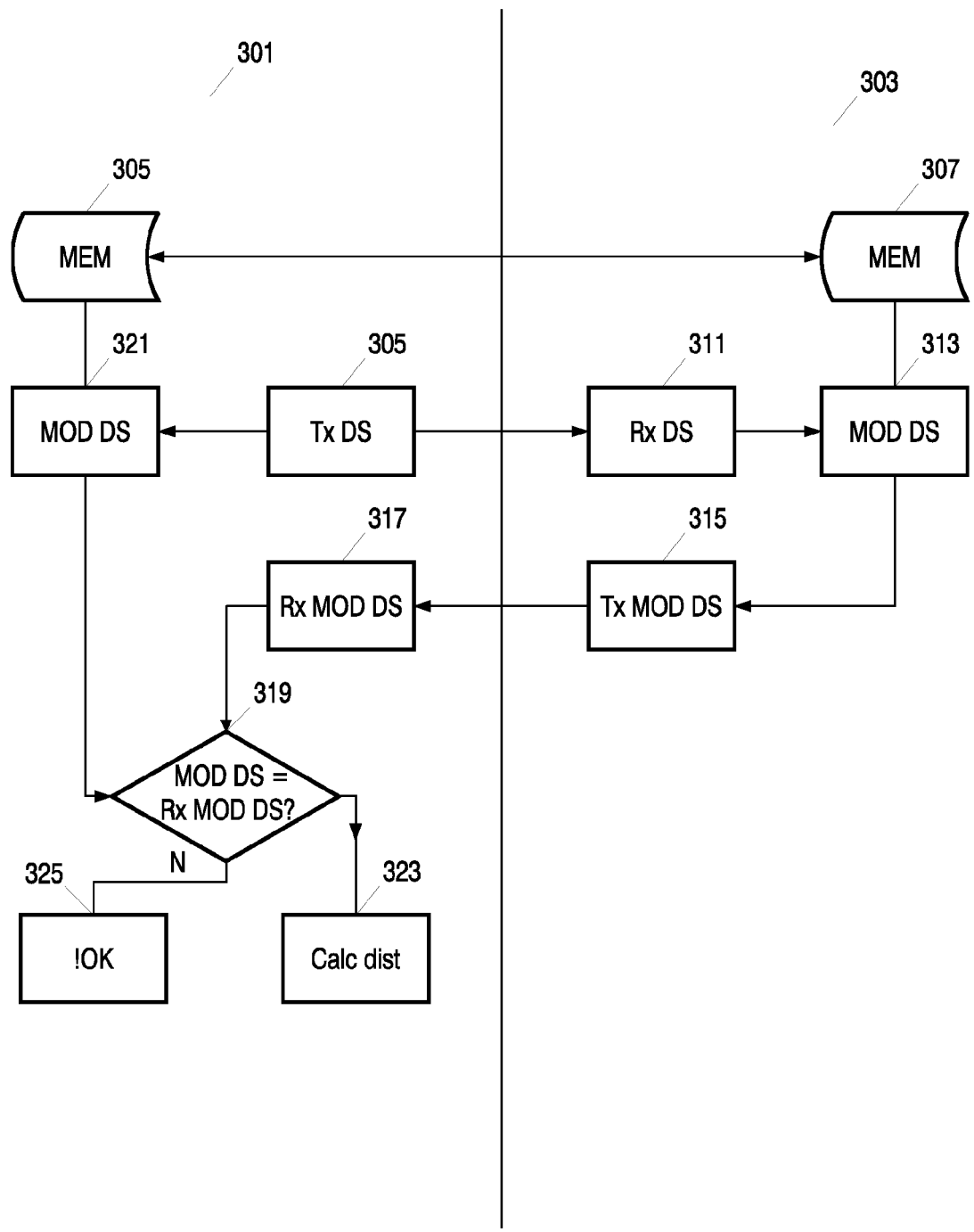
Figure 4:
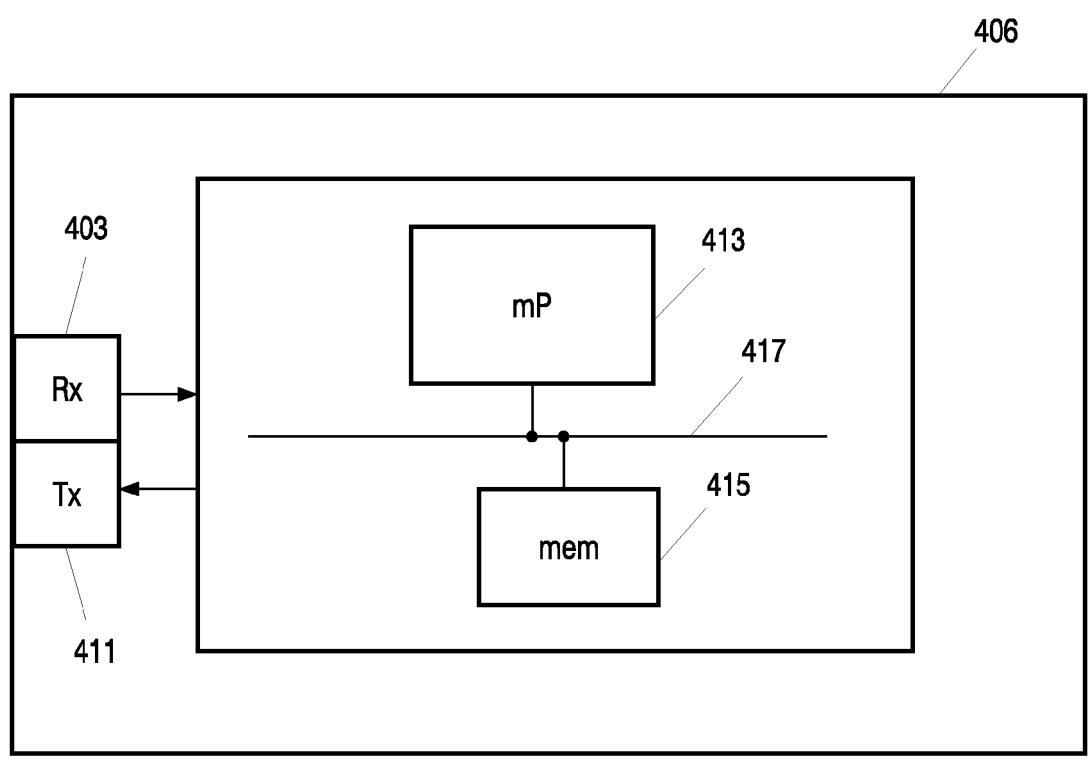

In the following preferred embodiments of the invention will be described referring to the figures, wherein FIG. 1 illustrates authenticated distance measurement being used for content protection, FIG. 2 is a flow diagram illustrating the method of performing authenticated distance measurement, FIG. 3 illustrates in further detail the step of performing the authenticated distance measurement shown in FIG. 2, FIG. 4 illustrates a communication device for performing authenticated distance measurement.

FIG. 1 illustrates an embodiment where authenticated distance measurement is being used for content protection. In the centre of the circle 101 a computer 103 is placed. The computer comprises content, such as multimedia content being video or audio, stored on e.g. a hard disk, DVD or a CD. The owner of the computer owns the content and therefore the computer is authorised to access and present the multimedia content for the user. When the user wants to make a legal copy of the content to another device via e.g. a SAC, the distance between the other device and the computer 103 is measured and only devices within a predefined distance illustrated by the devices 105, 107, 109, 111, 113 inside the circle 101 are allowed to receive the content. Whereas the devices 115, 117, 119 having a distance to the computer 101 being larger than the predefined distance are not allowed to receive the content.

In the example a device is a computer, but it could e.g. also be a DVD drive, a CD drive or a Video, as long as the device comprises a communication device for performing the distance measurement.

In a specific example the distance might not have to be measured between the computer, on which the data are stored, and the other device, it could also be a third device e.g. a device being personal to the owner of the content which is within the predefined distance.

In FIG. 2 a flow diagram illustrates the general idea of performing authenticated distance measurement between two devices, 201 and 203 each comprising communication devices for performing the authenticated distance measurement. In the example the first device 201 comprises content which the second device 203 has requested. The authenticated distance measurement then is as follows. In 205 the first device 201 authenticates the second device 203; this could comprise the steps of checking whether the second device 203 is a compliant device and might also comprise the step of checking whether the second device 203 really is the device identified to the first device 201. Then in 207, the first device 201 exchanges a secret with the second device 203, which e.g. could be performed by transmitting a random generated bit word to 203. The secret should be shared securely, e.g. according to some key management protocol as described in e.g. ISO 11770.

Then in 209, a signal for distance measurement is transmitted to the second device 203; the second device modifies the received signal according to the secret and retransmits the modified signal back to the first device. The first device 201 measures the round trip time between the signal leaving and the signal returning and checks if the returned signal was modified according to the exchanged secret. The modification of the returned signal according to some secret will most likely be dependent on the transmission system and the signal used for distance measurement, i.e. it will be specific for each communication system (such as 1394, Ethernet, Bluetooth, ieee 802.11, etc.).

The signal used for the distance measurement may be a normal data bit signal, but also special signals other than for data communication may be used. In an embodiment spread spectrum signals are used to be able to get high resolution and to be able to cope with bad transmission conditions (e.g. wireless environments with a lot of reflections).

In a specific example a direct sequence spread spectrum signal is used for distance measurement; this signal could be modified by XORing the chips (e.g. spreading code consisting of 127 chips) of the direct sequence code by the bits of the secret (e.g. secret consists also of 127 bits). Also, other mathematical operations as XOR could be used.

The authentication 205 and exchange of secret 207 could be performed using the protocols described in some known ISO standards ISO 9798 and ISO 11770. For example the first device 201 could authenticate the second device 203 according to the following communication scenario:

First device->Second device: $R_B\|Text 1$ where $R_B$ is a random number

Second device->First device: CertA$\|$TokenAB

Where CertA is a certificate of A

Token$AB=R_A\|R_B\|B\|Text3\|sS_A(R_A\|R_B\|B\|Text2)$ $R_A$ is a random number
Identifier B is an option
$sS_A$ is a signature set by A using private key $S_A$
If TokenAB is replaced with the token as specified in ISO 11770-3 we at the same time can do secret key exchange. We can use this by substituting Text2 by:

Text2$:=eP_B(A\|K\|Text2)\|Text3$

Where $eP_B$ is encrypted with Public key B
A is identifier of A
K is a secret to be exchanged In this case the second device 203 determines the key (i.e. has key control), this is also called a key transport protocol, but also a key agreement protocol could be used. This may be undesirable in which case it can be reversed, such that the first device determines the key. A secret key has now been exchanged according to 207 in FIG. 2. Again, the secret key could be exchanged by e.g. a key transport protocol or a key agreement protocol.

After the distance has been measured in a secure authenticated way as described above content, data can be send between the first and the second device in 211.

FIG. 3 illustrates in further detail the step of performing the authenticated distance measurement. As described above the first device 301 and the second device 303 have exchanged a secret; the secret is stored in the memory 305 of the first device and the memory 307 of the second device. In order to perform the distance measurement, a signal is transmitted to the second device via a transmitter 309. The second device receives the signal via a receiver 311 and 313 modifies the signal by using the locally stored secret. The signal is modified according to rules known by the first device 301 and transmitted back to the first device 301 via a transmitter 315. The first device 301 receives the modified signal via a receiver 317 and in 319 the received modified signal is compared to a signal, which has been modified locally. The local modification is performed in 321 by using the signal transmitted to the second device in 309 and then modifying the signal using the locally stored secret similar to the modification rules used by the second device. If the received modified signal and the locally modified signal are identical, then the received signal is authenticated and can be used for determining the distance between the first and the second device. If the two signals are not identical, then the received signal cannot be authenticated and can therefore not be used for measuring the distance as illustrated by 325. In 323 the distance is calculated between the first and the second device; this could e.g. be performed by measuring the time, when the signal is transmitted by the transmitter 309 from the first device to the second device and measuring when the receiver 317 receives the signal from the second device. The time difference between transmittal time and receive time can then be used for determining the physical distance between the first device and the second device.

In FIG. 4 a communication device for performing authenticated distance measurement is illustrated. The device 401 comprises a receiver 403 and a transmitter 411. The device further comprises means for performing the steps described above, which could be by executing software using a microprocessor 413 connected to memory 417 via a communication bus. The communication device could then be placed inside devices such as a DVD, a computer, a CD, a CD recorder, a television and other devices for accessing protected content.

The invention claimed is:

1. A method of determining whether protected content stored on a first communication device are accessed by a second communication device, the method comprising the step of:
    performing a round trip time measurement between the first communication device and the second communication device, said round trip time measurement comprising:
        transmitting a first signal to the second device at a first time;
        receiving a second signal from the second device at a second time,
        generating a third signal using a common secret;
        determining whether said second signal and said third signal are identical to verify that the second signal was generated using the common secret;
        generating the round trip time as a difference between said first time and said second time;
        checking whether the round trip time is within a predefined interval, and allowing access of the protected content provided that the round trip time is within the predefined interval, said second signal and said third signal are identical and the second device is authenticated,
    wherein:
    the first device authenticates the second device by:
        receiving a certificate of said second device;
        verifying that the certificate of said second device identifies said second device as complying with a set of predefined compliance rules, and the first device securely shares the common secret with the second device according to a key management protocol after having authenticated the second device.

2. The method according to claim 1, wherein the round trip time measurement comprises the steps of:
generating the second signal according to the common secret, and transmitting the second signal to the first device.

3. The method according to claim 2, wherein the first signal and the common secret are bit words and where the second signal comprises modifying the first signal by performing an XOR of the first signal with the common secret.

4. The method according to claim 1, wherein the authentication check of the second device further comprises the step of checking if the identification of the second device is compliant with an expected identification.

5. The method according to claim 1, in which the key management protocol comprises one of a key transport protocol and a key agreement protocol.

6. The method according to claim 1, wherein the common secret is securely shared with the second device by encrypting the common secret using a public key of a private/public key-pair.

7. The method according to claim 1, wherein the protected content stored on the first device (201) is sent to the second device (203) if it is determined that the protected content stored on the first device (201) is permitted to be shared with the second device (203).

8. The method according to claim 1, wherein securely sharing the common secret with the second device by the first device comprises transmitting a random generated bit word to the second device.

9. The method according to claim 1, wherein the common secret is used for generating a secure channel between the first and the second communication device.

10. A first communication device configured for determining whether protected content stored on the first communication device is available for access by a second communication device, the first communication device comprising:
means for performing an authentication of the second communication device, the authentication of the second device comprises:
receiving a certificate of the second device;
verifying that that the certificate of said second device identifies the second device as complying with a set of predefined compliance rules;
means for securely sharing a common secret with the second communication device after the second communication device is authenticated;
means for performing a round trip time measurement between the first communication device and the second communication device comprising:
transmitting a first signal to said second device at time t1;
receiving at time t2 a second signal from said second device, said second signal being generated using said common secret;
determining said round trip time measurement as a difference between time t1 and time t2;
means for checking whether the measured round trip time is within a predefined interval,
means for generating a third signal using said common secret;
means for checking whether said second signal and said third signal are identical; and
means for allowing access to said protected content when said round trip time measurement is within the predefined interval and the second and third signals are identical.

11. The first communication device according to claim 10, further comprising
means arranged to securely share the common secret with the second device by encrypting the common secret using a public key of a private/public key-pair.

12. The first communication device according to claim 10, further comprising:
means for transmitting the first signal at a first time t1,
means for receiving the second signal at a second time t2,
means for determining a time difference between the first time t1 and the second time t2.

13. A system for secure transfer of protected content comprising a first communication device in communication with a second communication device, the first communication device comprising:
a memory storing a common secret,
processing means:
performing an authentication of the second communication device comprising:
receiving a certificate of said second device;
checking whether the certificate of said second communication device is compliant with an expected identification of the second communication device;
securely sharing the common secret with the second communication device after the second communication device is authenticated;
generating a third signal using the common secret;
transmitting a first signal to the second communication device;
receiving a second signal from said second communication device;
checking whether said second and third signals are identical;
performing a round trip time measurement between the first communication device and the second communication device using times associated with the first and second signals,
checking whether the measured round trip time is within a predefined interval; and
transmitting the protected content to the second device depending on when the round trip time measurement is within the predefined interval and the second and third signals are identical.

14. A first device configured for determining whether protected content stored on a first communication device is available for access by a second communication device, the second device being adapted for receiving a first signal from the first device, generating a second signal according to a common secret, and transmitting the second signal to the first device, the first device comprising:
a transmitter;
a receiver;
a memory storing the common secret;
a bus connected to the memory;
a processor connected to the bus and controlling the transmitter and receiver, the processor executing the steps of:
measuring a round trip time between the first device and the second device, said measured round trip time being determined based on a time difference between signals transmitted between the first and second devices,
generating a third signal depending on the common secret;
determining whether the second signal received from the second device during the round trip measurement is identical to the third signal to verify that the second signal was generated using the common secret;

checking whether said measured round trip time is within a predefined interval, authenticating the second device, the authentication of the second device including:
receiving a certificate of the second device; and
verifying that the certificate of the second device identifies the second device as complying with a set of predefined compliance rules; and
securely transmitting the common secret to the second device after the second device has been authenticated.

15. The first communication device of claim 14 wherein the processor securely shares the common secret with the second communication device by encrypting the common secret using a public key of a private/public key-pair.

16. The first communication device of claim 14 wherein the processor performs the round trip time measurement by:
transmitting a first signal from the first device to the second device at time t1, receiving the second signal from the second device at time t2,
and
determining a time difference between the first time t1 and the second time t2.

* * * * *